UNITED STATES PATENT OFFICE 2,556,905

ACETALS OF TRIHALO PROPIONALDEHYDE AND PROCESS OF PREPARING SAME

John W. Copenhaver, Easton, Pa., assignor to General Aniline & Film Corporation, New York, N. Y., a corporation of Delaware No Drawing. Application November 5, 1948, Serial No. 58,623

6 Claims. (Cl. 260—615)

This invention relates to acetals of trihalopropionaldehyde and the method of producing them.

I have discovered that when a 1-halo-3-trihalopropyl ether is mixed with an alcohol, the ether and alcohol react to form in good yield an acetal of trihalopropionaldehyde. This reaction may be formulated as follows:

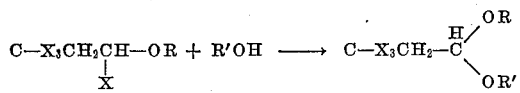

wherein R and R' stand for the same or different hydrocarbon radicals of an alcohol preferably a lower aliphatic alcohol, and X is halogen.

On merely mixing the tetrahalo ether and alcohol at room temperature, the reaction takes place to a considerable extent. However, in order to assure a good yield, it is preferable to employ an excess of alcohol (usually about 2 mols of alcohol per mol of tetrahalo ether), and to heat the reaction mixture to a temperature of from 50° C. to, say, 100° C. (usually about 60-70° C.).

The tetrahalo ethers which are employed in practicing the present invention may be prepared in good yield, as disclosed in my copending application Serial No. 61,736, filed November 23, 1948, by reacting a carbon tetrahalide with a vinyl ether in the presence of an organic peroxide catalyst. As examples of specific ethers which may be employed in practicing the present invention may be mentioned the methyl, ethyl, propyl and isopropyl, butyl, isobutyl and amyl ethers of such 1,3,3,3-tetrahalopropanols as 1,3,3,3-tetrachloropropanol, 1,3,3,3-tetrabromopropanol; also mixed halo ethers such as the ethers obtained when a mixed carbon tetrahalide such as trichlorobromomethane is reacted with a vinyl ether as described in my said application, whereby there is obtained 1-bromo-3-trichloropropanol, and the like. While it is preferred to employ the ethers of such tetrahalopropanols with lower aliphatic alcohols containing from 1 to 5 carbon atoms, the process is operative when the ethers with higher aliphatic alcohols such as lauryl alcohol, stearyl alcohol and the like are employed; also, dihydroxy alkanes such as ethylene glycol, trimethylene glycol, etc. (cyclic acetals being formed in this case). However, since the resulting products are of primary interest as chemical intermediates in syntheses in which the acetal group is reacted, it is preferable for obvious economic reasons to employ the ethers of lower aliphatic alcohols.

Likewise it is preferable to employ for most purposes a lower aliphatic alcohol as the other reactant in practicing the present invention, i. e. aliphatic alcohols containing from 1 to 5 carbon atoms (e. g. methyl, ethyl, propyl, butyl and amyl alcohols), although the process is operative with higher aliphatic alcohols (e. g. dodecanol or stearyl alcohol), and substituted alcohols such as chlorohydrin, benzyl alcohol, polyoxyethylene, 2-nitroethanol.

The following examples, in which the parts are by weight, illustrate in detail the present invention:

Example I

To 254 grams (1 mole) of 1,3,3,3-tetrachloropropyl butyl ether was added with stirring 148 grams (2 moles) of n-butanol. After the initial exothermic reaction was over, the reaction mixture was heated slowly to 60-70° C. for 1 hour. Hydrogen chloride was evolved copiously. After cooling, the solution was poured into sodium carbonate solution, washed free of acid and distilled to give a 69% yield of the di-n-butyl acetal of trichloropropionaldehyde (boiling point 110° C./2.0 mm., $n_D^{25}$ 1.4518.

Example II

To 226 grams (1.0 mole) of ethyl 1,3,3,3-tetrachloropropyl ether in 100 ml. of carbon tetrachloride there was slowly added with stirring 92 grams (2.0 moles) of ethanol (absolute). The temperature rose to 32° C. during the addition and hydrogen chloride was evolved. The solution was stirred for ½ hour at 30-32° C. and then warmed to 50-55° C. and kept at that temperature for 2 hours. The carbon tetrachloride, hydrogen chloride and excess ethanol were removed by distillation at reduced pressure and the thus obtained concentrate was distilled to give 220 grams (93% of theory) of 3,3,3-trichloropropionaldehyde diethyl acetal (boiling point 83-84° C. at 10 mm.); $n_D^{25}$ 1.4454; $d_4^{25}$ 1.1829; $M_D$ calculated 52.40; $M_D$ found 52.65.

Example III

The procedure of Example II is repeated to prepare the corresponding dimethyl acetal by using in place of the ethyl 1,3,3,3-tetrachloropropyl ether, 212 grams (1 mole) of methyl 1,3,3,3-tetrachloropropyl ether and 64 grams (2 moles) of methanol. The thus obtained 3,3,3-trichloropropionaldehyde dimethyl acetal had a boiling point of 75° C. at 14 mm., $n_D^{25}$ 1.4552.

Analysis calculated for $C_5H_9O_2Cl_3$: C, 28.94;

H, 4.37; Cl, 51.25. Found: C, 30.64; H, 4.92; Cl, 50.44.

As indicated by the analysis, slight dehydrohalogenation is believed to have taken place.

*Example IV*

500 ml. 3-necked round-bottom flask equipped with a sealed stirrer, condenser and thermometer was charged with 254 grams (1.0 mole) of butyl 1,3,3,3-tetrachloropropyl ether and 124 grams (2.0 moles) of ethylene glycol. The temperature was slowly raised to 80-90° C. and the contents of the flask were heated at this temperature until evolution of hydrogen chloride had proceeded. The alcoholysis proceeded readily and a mixture of acetals was obtained. The excess ethylene glycol was removed under reduced pressure and attempted fractionation of the concentrate gave a series of fractions boiling in the range of 94–98° C. at 3 mm. with refractive indices varying from 1.4352 to 1.4424 at 25° C. These products were a mixture of acetals, including dibutyl acetal of trichloropropionaldehyde and the cyclic acetal obtained by reaction of ethylene glycol with the tetrachloro ether, as indicated by the following equation:

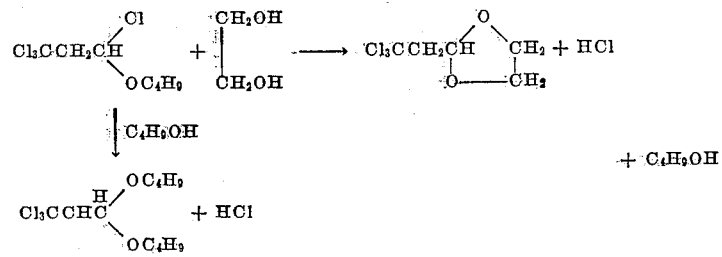

I claim:

1. The method of producing acetals of trihalopropionaldehyde which comprises reacting a 1,3,3,3-tetrahalopropylether of a hydroxy-substituted alkane with an aliphatic alcohol selected from the group consisting of hydroxy-substituted alkanes, chlorohydrin, benzyl alcohol, polyoxyethylene and 2-nitroethanol.

2. The process as defined in claim 1 wherein the tetrahaloether specified is a tetrachloroether.

3. The process as defined in claim 2 wherein the ether specified is the ether of a 1 to 5 carbon atom monohydroxy-substituted alkane and the alcohol specified is a 1 to 5 carbon atom monohydroxy-substituted alkane.

4. The process as defined in claim 1 wherein the ether specified is the ether of a 1 to 5 carbon atom monohydroxy-substituted alkane and the alcohol specified is a 1 to 5 carbon atom monohydroxy-substituted alkane.

5. Alkyl acetals of 3,3,3-trihalopropionaldehyde.

6. Lower alkyl acetals of 3,3,3-trichloropropionaldehyde.

JOHN W. COPENHAVER.

REFERENCES CITED

The following references are of record in the file of this patent:

Beilstein, "Handbuch der Organisher Chemie," 4th edition, vol. 1, supplement 2 (1941), page 681.